(12) United States Patent
Yoshida et al.

(10) Patent No.: US 7,925,926 B2
(45) Date of Patent: Apr. 12, 2011

(54) DISK ARRAY APPARATUS, COMPUTER-READABLE RECORDING MEDIUM HAVING DISK ARRAY APPARATUS CONTROL PROGRAM RECORDED THEREON, AND DISK ARRAY APPARATUS CONTROL METHOD

(75) Inventors: Masahiro Yoshida, Kawasaki (JP); Yasuhito Arikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 299 days.

(21) Appl. No.: 12/204,315

(22) Filed: Sep. 4, 2008

(65) Prior Publication Data

US 2009/0089503 A1 Apr. 2, 2009

(30) Foreign Application Priority Data

Sep. 28, 2007 (JP) ................. 2007-255197

(51) Int. Cl.
*G06F 11/00* (2006.01)
(52) U.S. Cl. ........................................ 714/25
(58) Field of Classification Search .................. 714/5–7, 714/25–27, 31, 33, 37–39, 41–42, 47, 48, 714/54
See application file for complete search history.

(56) References Cited

U.S. PATENT DOCUMENTS

| | | | | |
|---|---|---|---|---|
| 6,035,306 A * | 3/2000 | Lowenthal et al. | | 1/1 |
| 7,171,668 B2 * | 1/2007 | Molloy et al. | | 718/105 |
| 7,313,659 B2 * | 12/2007 | Suzuki | | 711/154 |
| 7,356,643 B2 * | 4/2008 | Allison et al. | | 711/114 |
| 2003/0115244 A1 * | 6/2003 | Molloy et al. | | 709/105 |
| 2005/0086554 A1 * | 4/2005 | Simes | | 714/4 |
| 2005/0262400 A1 | 11/2005 | Nadeau et al. | | |
| 2006/0069866 A1 | 3/2006 | Miyazaki | | |
| 2007/0113009 A1 * | 5/2007 | Fujibayashi | | 711/114 |
| 2008/0114931 A1 * | 5/2008 | Aoki | | 711/114 |
| 2009/0089503 A1 * | 4/2009 | Yoshida et al. | | 711/114 |

FOREIGN PATENT DOCUMENTS

| | | |
|---|---|---|
| JP | 2005-322399 | 11/2005 |
| JP | 2006-92070 | 4/2006 |

OTHER PUBLICATIONS

Japanese Office Action dated Oct. 13, 2009 and issued in corresponding Japanese Patent Application 2007-255197.

* cited by examiner

*Primary Examiner* — Nadeem Iqbal

(74) *Attorney, Agent, or Firm* — Staas & Halsey LLP

(57) ABSTRACT

A disk array apparatus has a plurality of disks constituting a mounted RAID group and controls access from an upper-level device to each of the disks. The disk array apparatus also has a performance information collector for collecting a piece of performance-related information of each of the disks, and a suspected disk detector for comparing the pieces of information collected for the disks by the performance information collector among disks constituting a single one of the RAID group and detecting a suspected disk suspected of being abnormal in performance based on a result of the comparison.

11 Claims, 17 Drawing Sheets

FIG. 5

| DISK NO | ACCESS TIME |
|---|---|
| DISK 0x200 | 9 |
| DISK 0x201 | 13 |
| ⋮ | ⋮ |
| DISK 0x208 | 52 |
| ⋮ | ⋮ |

FIG. 6

| DISK NO | BUSY RATE |
|---|---|
| 0x200 | 22 |
| 0x201 | 21 |
| ⋮ | ⋮ |
| 0x208 | 95 |
| ⋮ | ⋮ |

FIG. 7

| RAID GROUP NO 8 | |
|---|---|
| DISK NO | BUSY RATE |
| 0x008 | 20 |
| 0x108 | 22 |
| 0x208 | 95 |
| 0x308 | 19 |

| DISK NO | ABNORMALITY DETECTION |
|---|---|
| 0x000 | 0 |
| 0x001 | 0 |
| ⋮ | ⋮ |
| 0x208 | 1 |
| ⋮ | ⋮ |

DISK ARRAY APPARATUS, COMPUTER-READABLE RECORDING MEDIUM HAVING DISK ARRAY APPARATUS CONTROL PROGRAM RECORDED THEREON, AND DISK ARRAY APPARATUS CONTROL METHOD

CROSS-REFERENCE TO RELATED APPLICATIONS

This application is related to and claims priority to Japanese patent application No. 2007-255197, filed on Sep. 28, 2007 in the Japan Patent Office, the entire contents of which are incorporated by reference herein.

BACKGROUND OF THE INVENTION

1. Field of the Invention

The present invention relates to a disk array apparatus, a computer-readable recording medium having a disk array apparatus control program recorded thereon, and a disk array apparatus control method.

2. Description of the Related Art

Conventionally, data input/output devices have a disk mounted thereon and control access from an upper-level device to the disk. More specifically, a data input/output device reads out requested data from a disk when it is required to read out the data by an upper-level device and writes data to the disk when it is required to write the data. Among data input/output devices, disk array apparatuses are designed with disk redundancy so as not to lose data even if one disk fails.

More specifically, a disk array apparatus has a plurality of disks constituting a RAID (Redundant Arrays of Inexpensive Disks) group mounted thereon and controls access from an upper-level device to each of the disks. The maximum storage capacities of disk array apparatuses have recently increased with an increase in the storage capacities of disks up to the order of petabytes. The number of disks constituting a RAID group has increased in proportion to the increase in the storage capacities of disks.

If, as described above, the number of disks mounted on a disk array apparatus increases, the likelihood of disk failures also increases. For this reason, periodic medium check and status monitoring are generally performed on disks mounted on a disk array apparatus. The constant monitoring of the statuses of the disks is aimed at early detection of a disk with a medium abnormality or driving system abnormality and normalization of the status.

The above-described conventional technique suffers from the problem of an inability to appropriately detect a performance abnormality (a fault which causes a disk to have an abnormal performance value). That is, although the conventional technique is capable of detecting a medium abnormality and a driving system abnormality, as described above, it is incapable of detecting a performance abnormality. This is because a disk can operate with performance of a level which is not recognized as abnormal by an upper-level device, even though the performance of a disk with a performance abnormality is poorer than one under normal conditions, since a timeout for processing or the like does not occur. Although a disk with a performance abnormality operates without causing a so-called abnormality, if a data access delay due to the performance abnormality occurs, an event which interferes with normal functioning of a system (e.g., a process which has conventionally been completed within a prescribed time fails to be completed within the prescribed time) may occur.

For this reason, it is necessary to detect a disk with a performance abnormality.

SUMMARY

In order to solve the above-described problem and achieve an object, according to the present invention, there is provided a disk array apparatus which has a plurality of disks constituting a mounted RAID group and controls access from an upper-level device to each of the disks, comprising a performance information collector for collecting a piece of performance-related information of each of the disks and a suspected disk detector for comparing the pieces of information collected for the disks by the performance information collector among disks constituting a single one of the RAID group and detecting a suspected disk suspected of being abnormal in performance based on a result of the comparison.

The above-described embodiments of the present invention are intended as examples, and all embodiments of the present invention are not limited to including the features described above.

BRIEF DESCRIPTION OF THE DRAWINGS

FIG. 5 is a chart for explaining an access monitoring section;

FIG. 6 is a chart for explaining a performance information collection section;

FIG. 7 is a chart for explaining a suspected disk detection section;

DETAILED DESCRIPTION OF THE PREFERRED EMBODIMENTS

Figure 1:
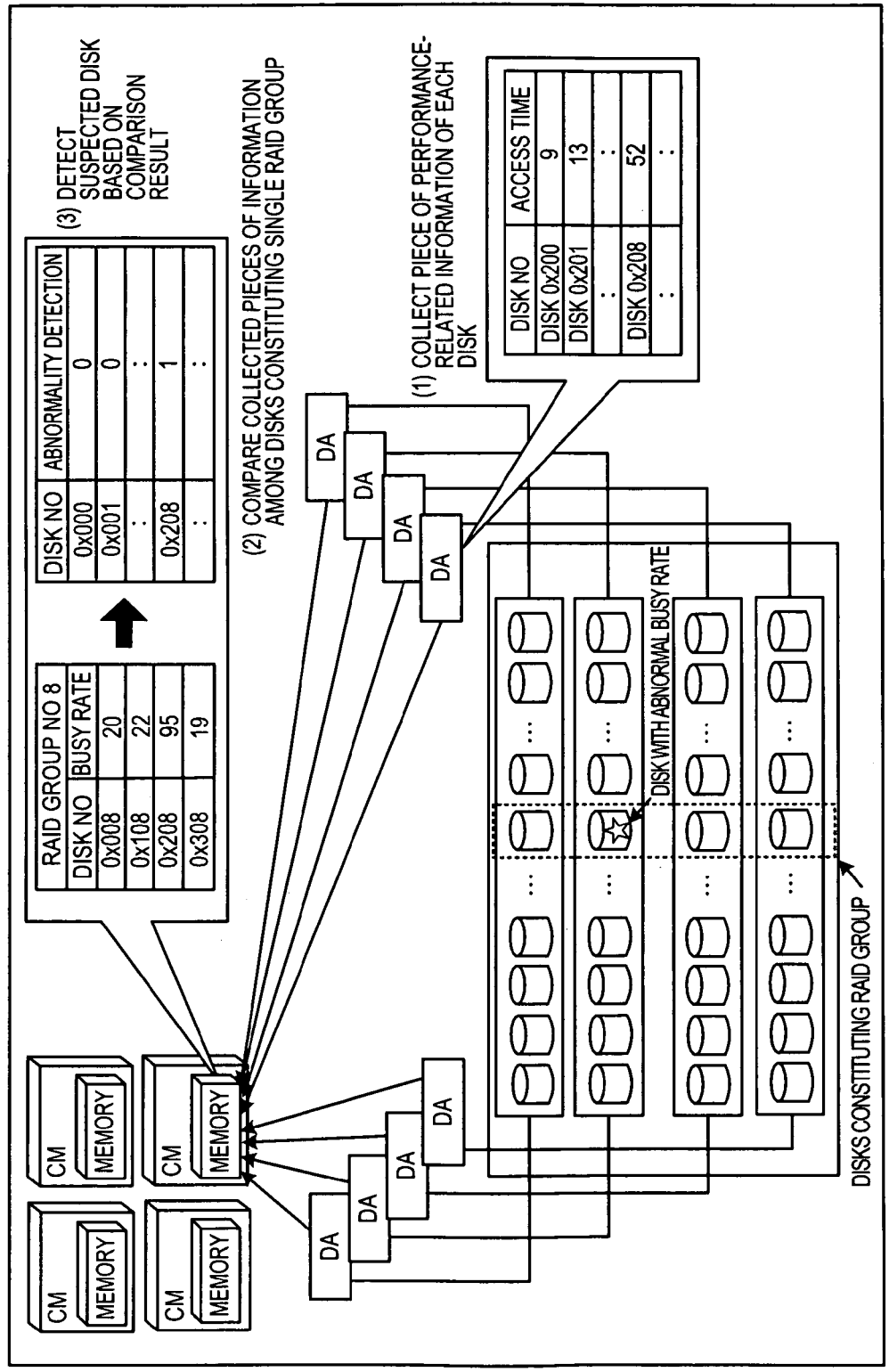
FIG. 1 is a diagram for explaining the overview and features of a disk array apparatus according to a first embodiment.

Reference may now be made in detail to embodiments of the present invention, examples of which are illustrated in the accompanying drawings, wherein like reference numerals refer to like elements throughout.

Embodiments of a disk array apparatus, a computer-readable recording medium having a disk array apparatus control program recorded thereon, and a disk array apparatus control method according to the present invention will be described in detail below with reference to the drawings. Note that, in the following explanation, main terms used in the embodiments below, the overview and features of a disk array apparatus according to a first embodiment, the configuration of the disk array apparatus according to the first embodiment, and the procedure for processing of the disk array apparatus according to the first embodiment will be described in this order, and other embodiments will be finally described.

Description of Terms

First, main terms used in the embodiments below will be described. The term "disk array apparatus" refers to an apparatus which has a plurality of disks constituting a RAID (Redundant Arrays of Inexpensive Disks) group mounted thereon and controls access from a host as an upper-level device to each of the disks. The term "RAID" refers to a technique for grouping a plurality of disks together and managing the disks as one disk. A "disk array apparatus" controls a plurality of disks constituting a RAID group, thereby increasing high-speed performance, failure resistance, and the like.

There are levels of "RAID" defined in terms of high-speed performance and failure resistance. For example, "RAID0" is an implementation of RAID with striping and distributes data evenly across a plurality of disks. "RAID1" is an implementation of RAID with mirroring and simultaneously writes a single piece of data to two disks. "RAID1+0" is an implementation of RAID with mirroring and striping. "RAID3", "RAID4", or "RAID5" allocates one of a plurality of disks for recording of an error correcting code called parity and distributes data to the other disks. "RAID6" allocates two of a plurality of disks for recording of parity (double parity) and distribute data among the other disks.

Although "disk array apparatuses" can be said to be suitable for a system requiring high-speed performance and failure resistance, situations are arising where the likelihood of disk failures increases with an increase in the number of disks which a "disk array apparatus" needs to control. For this reason, there is a need for a mechanism for detecting a disk failure early and achieving normalization of the status of a "disk array apparatus". Among disk failures, performance abnormalities are hard to detect early.

This point will be briefly described. A performance abnormality, unlike a medium abnormality and a driving system abnormality, refers to an abnormality which causes a disk to have an abnormal performance value and causes the disk to operate without causing a so-called abnormality. A specific example will be given. Assume that a disk is slightly inclined in the internal structure of disks. A magnetic head is positioned with respect to a rotating disk by a seek action. Even when the disk is slightly inclined at this time, correction is generally performed, thus resulting in accurate positioning. Since repetition of such a retry action allows correct read access and write access, the action appears to be normal. This makes it difficult to detect a performance abnormality due to a slight inclination of a disk early.

However, if a performance abnormality recurs with a high probability due to a factor internal to a disk such as a slight inclination of the disk, a failure critical for a system requiring high-speed performance and failure resistance may occur. A performance abnormality as described above is thus no different from a medium abnormality and a driving system abnormality and is an abnormality requiring early detection.

First Embodiment

Overview and Feature of Disk Array Apparatus According to First Embodiment

The overview and features of a disk array apparatus according to the first embodiment will be described with reference to FIG. 1. FIG. 1 is a diagram for explaining the overview and features of a disk array apparatus according to the first embodiment.

The overview of the disk array apparatus according to the first embodiment is such that the disk array apparatus has a plurality of disks constituting a RAID group mounted thereon and controls access from an upper-level device to each of the disks, as described above. The disk array apparatus mainly features appropriate detection of a disk with a performance abnormality.

The main feature will be simply described. FIG. 1 is a diagram, simplified for convenience of explanation, showing the configuration of the disk array apparatus and shows that a CM (Controller Module) of the disk array apparatus is connected to a plurality of disks via DAs (Device Adapters). As shown in FIG. 1, each DA calculates an access time serving as a cumulative value for each of a plurality of disks connected to the DA in the first embodiment.

With this configuration, the disk array apparatus according to the first embodiment collects a piece of performance-related information of each disk (see (1) in FIG. 1). For example, the CM of the disk array apparatus instructs each DA to transmit access times collected by the DA and acquires the access time of each of the plurality of disks connected to the DA. The CM calculates a utilization rate (busy rate) for each of the disks on the basis of the acquired access times and the like.

The disk array apparatus compares, among ones of the disks constituting a single RAID group, the pieces of information collected for the disks (see (2) in FIG. 1). For example, the CM of the disk array apparatus compares, among the disks constituting the single RAID group, the highest utilization rate and the second highest utilization rate of the utilization rates collected for the disks and determines whether there is a difference of not less than (n) times (n is a separately set predetermined value of, e.g., 2 to 5) the second highest utilization rate.

An explanation will be given using the example in FIG. 1. For example, assume that RAID group No. 8 is composed of disk Nos. "0x008", "0x108", "0x208", and "0x308". The CM of the disk array apparatus compares utilization rates among the disks and determines that the highest utilization rate of "95" is not less than four times the second highest utilization rate of "22".

The disk array apparatus detects a suspected disk on the basis of the comparison result ((3) in FIG. 1). For example, the CM of the disk array apparatus detects, as a suspected disk, one with the highest utilization rate, i.e., disk No. "0x208" with the utilization rate of "95".

As described above, according to the disk array apparatus of the first embodiment, it is possible to appropriately detect a disk with a performance abnormality by comparing pieces of performance-related information among disks constituting a single RAID group.

In a disk array apparatus having a RAID group, the utilization rates (busy rates) of disks should be almost uniform (disks are selected such that the utilization rates of the disks are almost uniform, depending on the type of the RAID group). A disk whose utilization rate is notably high should perform an extra process other than normal processing (e.g., a retry action due to an inclination of a disk), and repetition of such an extra process becomes a factor for a performance abnormality. For this reason, according to the disk array apparatus of the first embodiment, it is possible to compare disk utilization rates among disks constituting a single RAID group, detect one of the disks whose utilization is notably high, and thereby appropriately detect a disk with a performance abnormality.

Configuration of Disk Array Apparatus According to First Embodiment

Figure 2:
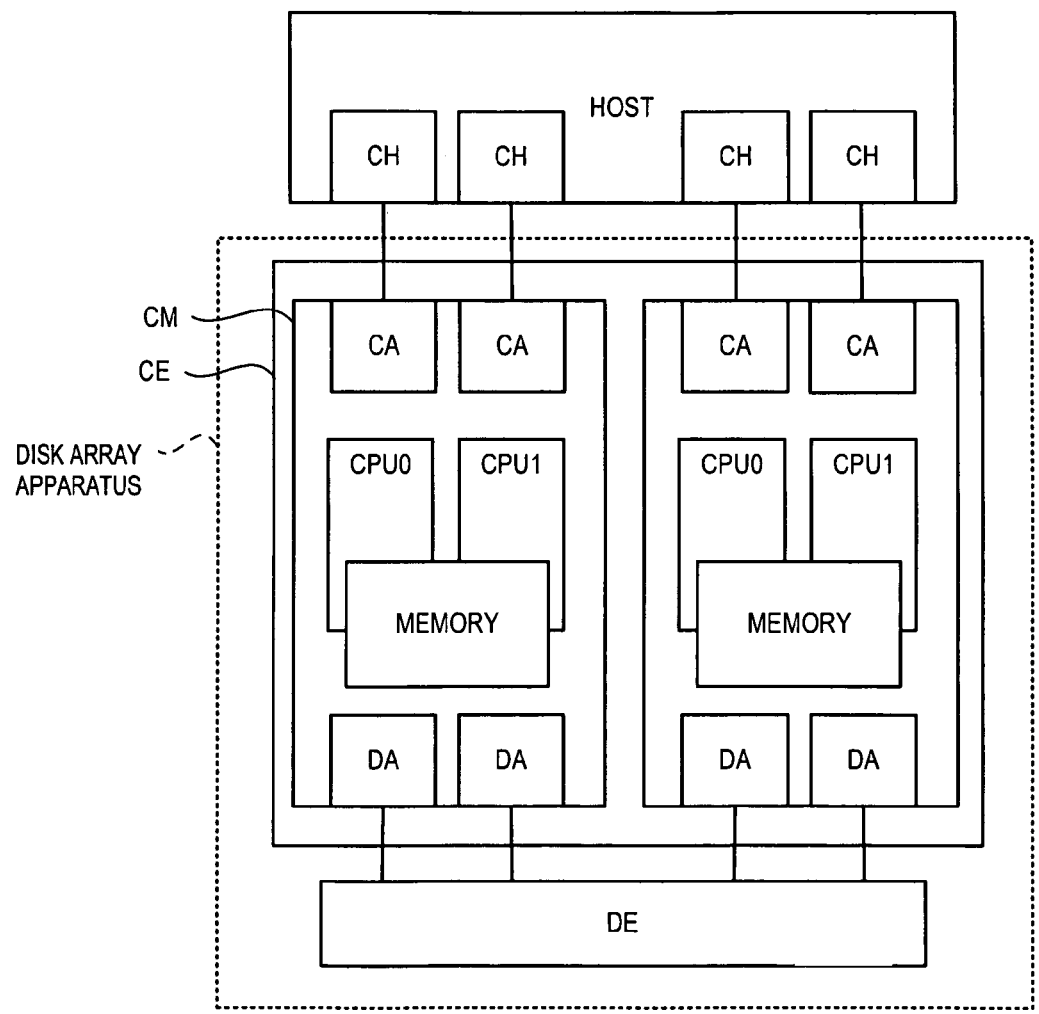
FIG. 2 is a block diagram showing the overall configuration (outline) of the disk array apparatus.
Figure 3:
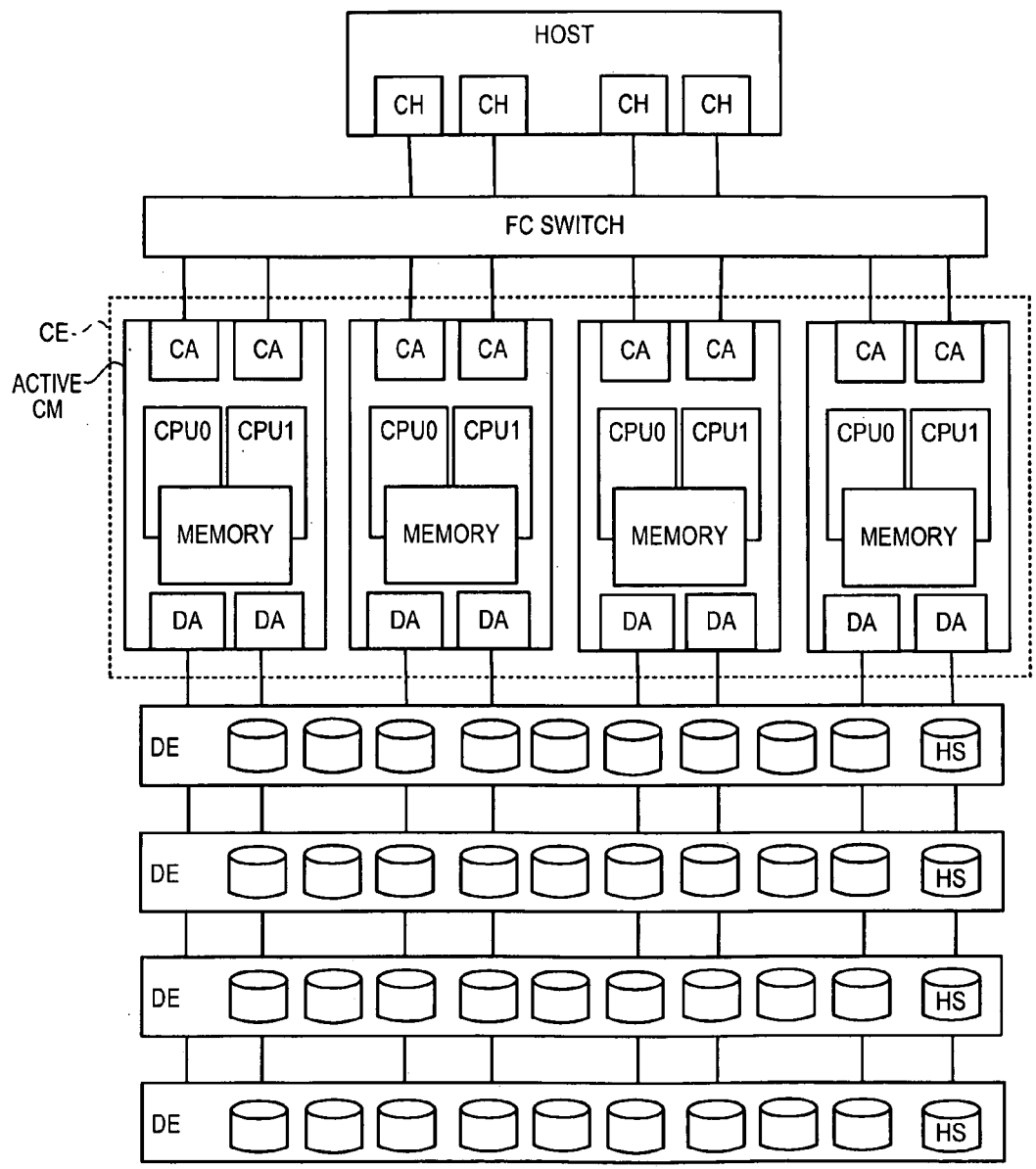
FIG. 3 is a block diagram showing the overall configuration of the disk array apparatus.
Figure 4:
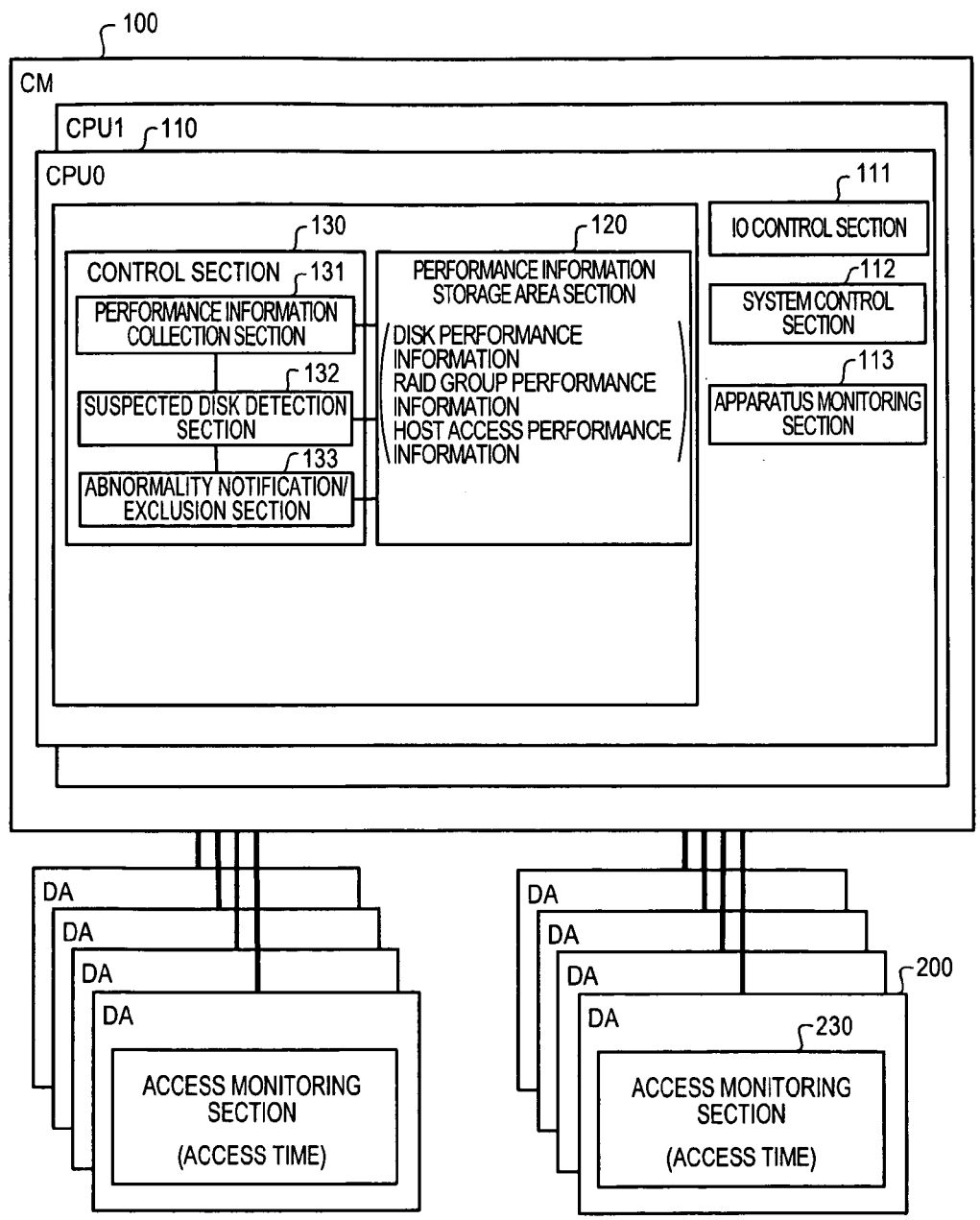
FIG. 4 is a block diagram showing the configuration of the disk array apparatus according to the first embodiment.
Figure 6:
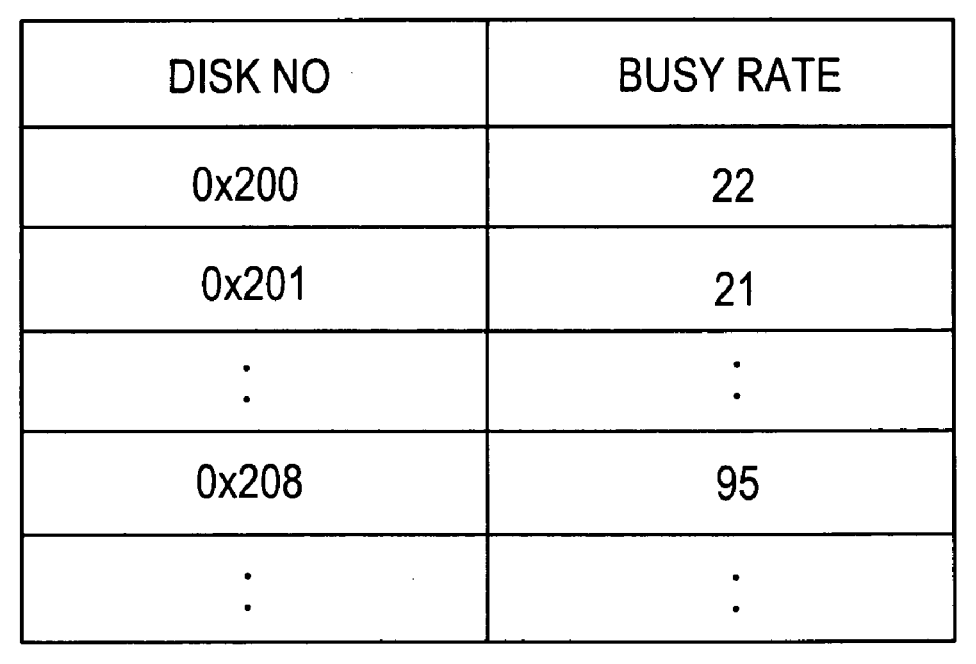

The configuration of the disk array apparatus according to the first embodiment will be described with reference to FIGS. 2 to 7. FIG. 2 is a block diagram showing the overall configuration (outline) of a disk array apparatus. FIG. 3 is a block diagram showing the overall configuration of the disk array apparatus. FIG. 4 is a block diagram showing the configuration of the disk array apparatus according to the first embodiment. FIG. 5 is a chart for explaining an access monitoring section. FIG. 6 is a chart for explaining a performance information collection section. FIG. 7 is a chart for explaining a suspected disk detection section.

Overall Configuration of Disk Array Apparatus

The overall configuration of the disk array apparatus will first be described. The disk array apparatus according to the first embodiment has a housing divided into a CE (Controller Enclosure) section which mainly has sections controlling the disk array apparatus and communication modules between the disk array apparatus and an upper-level device (host) mounted thereon and a DE (Device Enclosure) section which has disks mounted thereon, as shown in FIG. 2. The disk array apparatus is connected to the host as the upper-level device via CAs (Channel Adapters) and is connected to the DE section via DAs (Device Adapters), as shown in FIG. 2. Here, a CA refers to a channel-side adapter, and a DA refers to a device-side adapter.

Note that each DA is configured in hardware if the disk array apparatus has a plurality of disks external thereto and is configured in software if the disk array apparatus has a plurality of disks internal thereto. Although the former case will be described in the first embodiment, the present invention is not limited to this. The disk array apparatus may have disks mounted thereon in any form.

The disk array apparatus according to the first embodiment has two or more CMs (Controller Modules) to be used for operation and is configured for redundancy, as shown in FIG. 2. A plurality of DE sections according to the first embodiment can be connected to the DAs directly, via a router, or the like, as shown in FIG. 3.

Configuration of CM

A CM of the disk array apparatus according to the first embodiment will be described. As shown in FIG. 4, a CM 100 has an IO control section 111, a system control section 112, an apparatus monitoring section 113, a performance information storage area section 120, and a control section 130 in a CPU 110 (although CPU0 is illustrated as the CPU 110 in FIG. 4, CPU1 is configured in almost the same manner if CPU redundancy is ensured).

The IO control section 111 controls I/O (input/output) from/to the upper-level device (host). The system control section 112 controls the disk array apparatus. The apparatus monitoring section 113 monitors the device status of the disk array apparatus. Such sections are generally provided in a disk array apparatus.

The disk array apparatus according to the first embodiment includes the control section 130 in addition to the above-described IO control section 111, system control section 112, and apparatus monitoring section 113. The control section 130 performs storage, management, determination, and the like on the status of access to each disk. More specifically, the control section 130 includes a performance information collection section 131, a suspected disk detection section 132, and an abnormality notification/exclusion section 133, as shown in FIG. 4.

The performance information collection section 131 collects a piece of performance-related information of each disk. For example, the performance information collection section 131 periodically collects pieces of performance-related information of disks (the utilization rates of the disks derived from access to the disks within a predetermined time in the first embodiment) on a disk by disk basis or a RAID group by RAID group basis. The collected pieces of performance-related information are stored in the performance information storage area section 120 and are used for processing by the suspected disk detection section 132.

A specific example will be given. In the first embodiment, each DA 200 includes an access monitoring section 230, as shown in FIG. 4. The access monitoring section 230 monitors access and calculates an access time serving as a cumulative value for each of a plurality of disks connected to the DA 200. An explanation will be given using the example in FIG. 5. The access monitoring section 230 of each DA 200 calculates access times serving as cumulative values for a plurality of disks, disk No. "0x200", disk No. "0x201", . . . , disk No. "0x208", . . . , connected to the DA 200 as "9", "13", . . . , "52", . . . , respectively.

The performance information collection section 131 instructs each DA 200 to transmit access times and acquires the access times for the plurality of disks connected to the DA 200 from the access monitoring section 230. The performance information collection section 131 calculates the utilization rates of the disks on the basis of the access times and the like acquired from the access monitoring section 230. An explanation will be given using the example in FIG. 6. The performance information collection section 131 calculates the utilization rates (busy rates) for the plurality of disks, disk No. "0x200", disk No. "0x201", . . . , disk No. "0x208", . . . , as "22", "21", . . . , "95", . . . , respectively. In this manner, the performance information collection section 131 collects the utilization rate of each disk.

Note that although a method in which the access monitoring section 230 of each DA 200 calculates an access time serving as a cumulative value for each disk, and the performance information collection section 131 calculates the utilization rate of the disk on the basis of the access time and the like acquired from the access monitoring section 230 has been described in the first embodiment, the present invention is not limited to this. For example, the present invention can also be applied to a method in which the access monitoring section 230 of each DA 200 not only calculates an access time serving as a cumulative value but also calculates a utilization rate for each disk, and the performance information collection section 131 acquires the utilization rate directly from the access monitoring section 230. The present invention can be similarly applied to, e.g., a method in which the performance information collection section 131 directly collects the access time of each disk. The latter method is applied to, e.g., a case where the disk array apparatus has a plurality of disks internal thereto.

The suspected disk detection section 132 compares, among disks constituting a single RAID group, pieces of information collected for disks and detects a suspected disk suspected of being abnormal in performance on the basis of the comparison result.

For example, the suspected disk detection section 132 acquires pieces of information (utilization rates in the first embodiment) collected for disks by the performance information collection section 131 from the performance information storage area section 120 and compares, among disks constituting a single RAID group, the highest utilization rate and the second highest utilization rate. If there is a difference of not less than (n) times (n is a separately set predetermined value of, e.g., 2 to 5) the latter, the suspected disk detection section 132 detects one of the disks with the highest utilization rate as a suspected disk.

An explanation will be given using the example in FIG. 7. For example, if RAID group No. 8 is composed of disk Nos. "0x008", "0x108", "0x208", and "0x308", the suspected disk detection section 132 compares utilization rates among the disks. Since the highest utilization rate of "95" is not less than four times the second highest utilization rate of "22", the suspected disk detection section 132 detects disk No. "0x208" with the utilization rate of "95" as a suspected disk.

For example, the suspected disk detection section 132 may acquire pieces of information (utilization rates in the first embodiment) collected for disks by the performance information collection section 131 from the performance information storage area section 120 and compare the utilization rate of a predetermined disk (each of disks constituting a single RAID group) with an average utilization rate for the disks constituting the single RAID group. If there is a difference of not less than a fixed value, the suspected disk detection section 132 may detect the disk as a suspected disk.

The comparison is performed in consideration of a RAID level. For example, a RAID group configured as RAID1 can be said to be a RAID group with only mirroring. In the case of a RAID group with only mirroring, access may be made to only a group of mirror disks on one side among disks constituting a single RAID group, and read access may be unevenly distributed (although such unevenness is unlikely to occur in a system which distributes read access as needed, read access generally may be unevenly distributed). For this reason, in a RAID1 abnormal disk detection check process, the suspected disk detection section 132 not only compares utilization rates among disks but also check the status of read access. On that basis, the suspected disk detection section 132 detects whether each disk is a suspected disk suspected of being abnormal in performance.

For example, a RAID group configured as RAID1+0 can be said to a RAID group with both mirroring and striping. For this reason, the suspected disk detection section 132 compares utilization rates among disks in a RAID group configured as RAID1+0 on a stripe group by stripe group basis (compares the utilization rates of all of disks in a single stripe group).

For example, a RAID group configured as RAID5 can be said to be a RAID group with parity. In the case of a RAID group with parity, access should be evenly made to almost all disks. For this reason, the suspected disk detection section 132 compares utilization rates among disks in a RAID group configured as RAID5.

When a suspected disk is detected, the suspected disk detection section 132 accumulates a piece of detection information for the suspected disk by a point addition method. An explanation will be given using the example in FIG. 7. When disk No. "0x208" is detected as a suspected disk, the suspected disk detection section 132 accumulates a piece of detection information of "1" for disk No. "0x208" in the performance information storage area section 120 by the point addition method.

The abnormality notification/exclusion section 133 outputs notification information (indicating that a suspected disk is detected) to a predetermined output section (e.g., outputs the notification information to a display) or transmits the notification information to a predetermined destination via a communication section (e.g., transmits e-mail to a monitoring system of the disk array apparatus) and excludes a suspected disk from access, on condition that the point of pieces of information accumulated by the suspected disk detection section 132 has exceeded a predetermined threshold value. In other words, the abnormality notification/exclusion section 133 continues monitoring of the suspected disk detected by the suspected disk detection section 132 for a fixed time and, if the disk enters a state determined as truly abnormal, performs alarm notification or isolation of the suspected disk.

For example, the abnormality notification/exclusion section 133 checks, on a disk by disk basis, the point of pieces of information accumulated in the performance information storage area section 120 by the suspected disk detection section 132. If a threshold value for abnormality determination based on the ratio of the number of times abnormality points are detected to the number of check (a predetermined value set in advance, e.g., 50 out of 100 times) has been exceeded, the abnormality notification/exclusion section 133 performs output and transmission of notification information, isolation of a suspected disk, and the like.

Note that the abnormality notification/exclusion section 133 can take various measures, such as performing only output and transmission of notification information, performing isolation of a suspected disk in addition to output and transmission of notification information, disabling both output and transmission of notification information and isolation, according to a separately made setting. A general disk array apparatus may be configured to perform redundant copying at the time of disk isolation. However, if a disk array apparatus performs redundant copying at the time of isolation of a suspected disk, performance degradation may be accelerated. For this reason, when the disk array apparatus is to perform disk isolation on a suspected disk, it is preferable to isolate the disk immediately and perform rebuilding and the like. Alternatively, the abnormality notification/exclusion section 133 may transmit an SNMP trap together with notification information.

The performance information storage area section 120 stores, e.g., utilization rates collected for disks (disk performance information), utilization rates collected for disks constituting a single RAID group (RAID group performance information), and the statuses of access from an upper-level device to the disks (host access performance information), as shown in FIG. 4. Note that pieces of information to be stored in the performance information storage area section 120 are not limited to the above-described ones and are changed depending on the form of operation.

Procedure for Processing by Disk Array Apparatus According to First Embodiment

Figure 8:
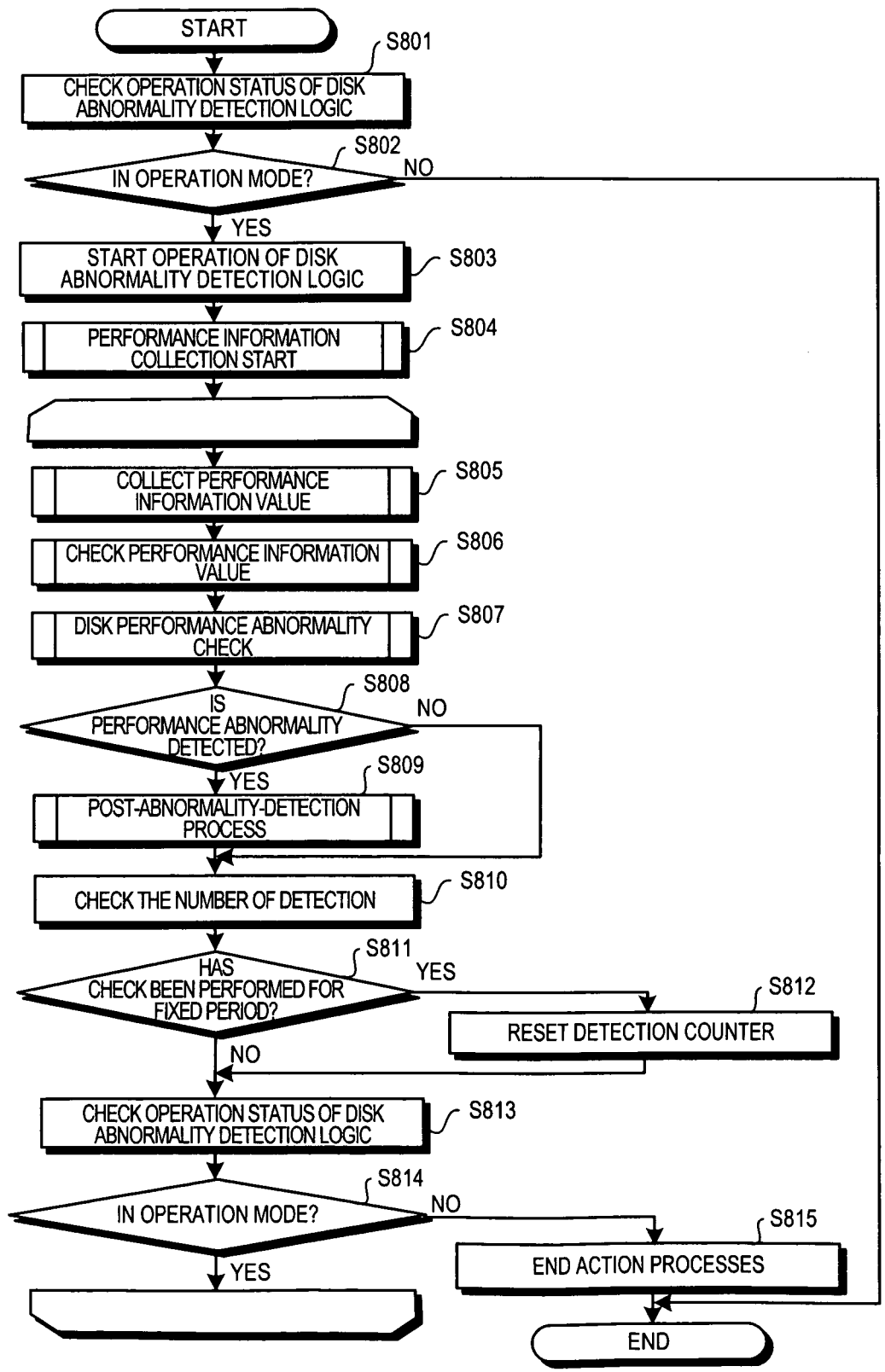
FIG. 8 is a flow chart showing an operation determination/overall flow.
Figure 9:
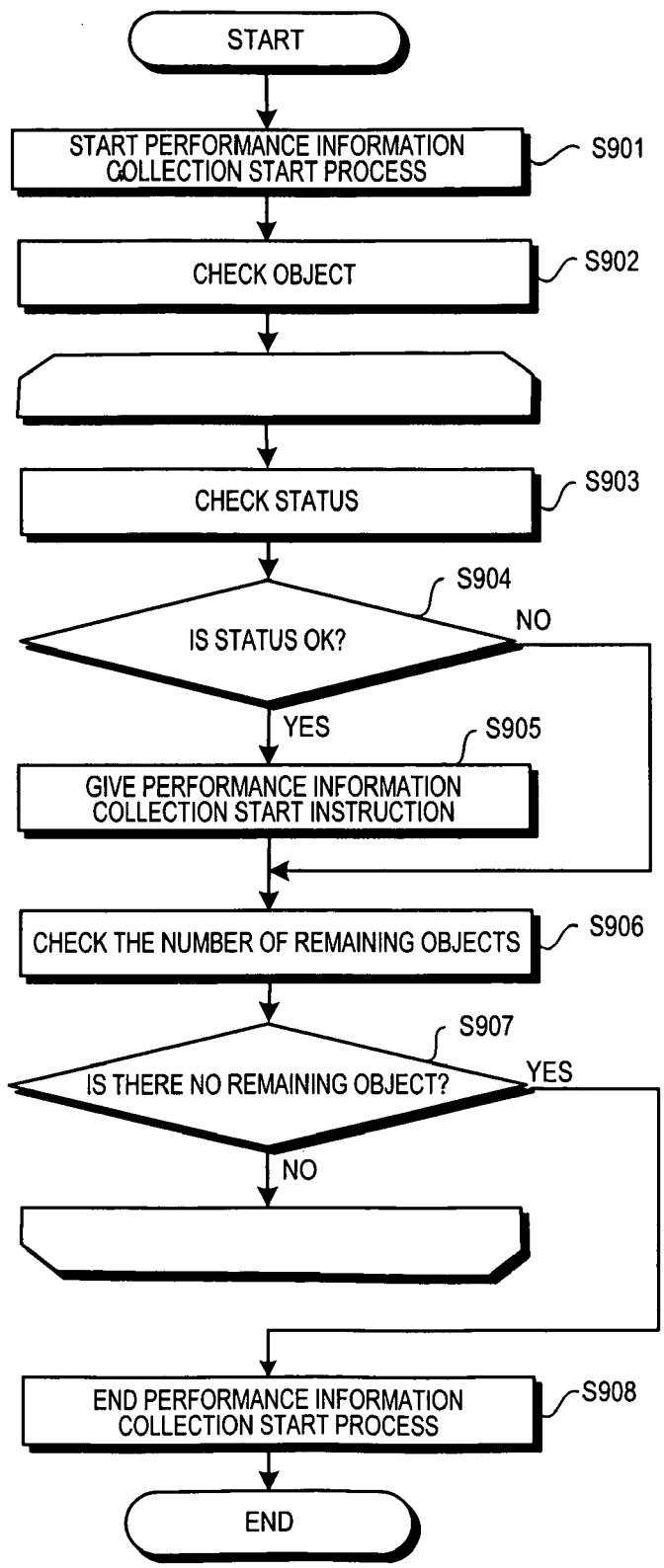
FIG. 9 is a flow chart showing a performance information collection start process.
Figure 10:
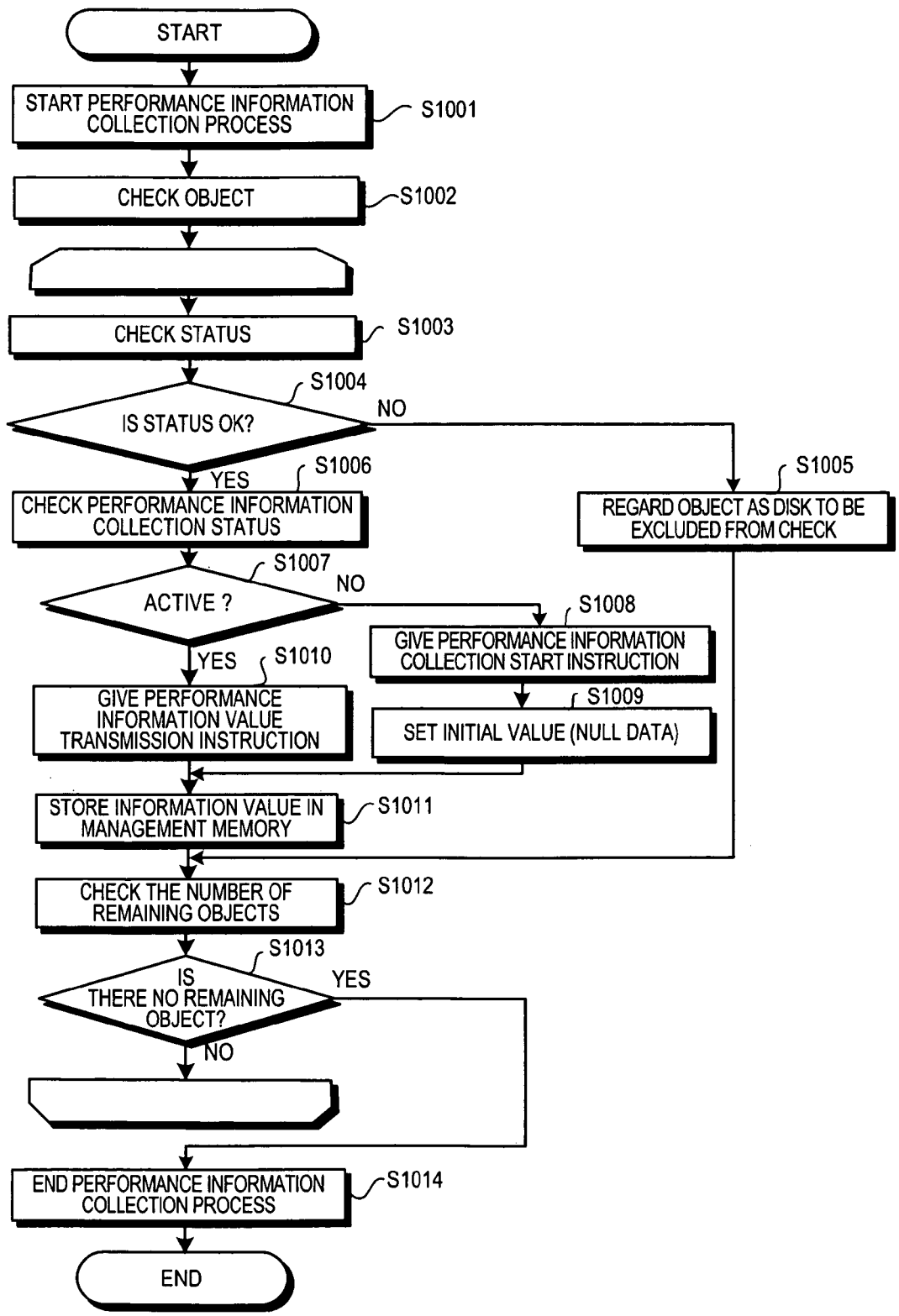
FIG. 10 is a flow chart showing a performance information value collection process.
Figure 11:
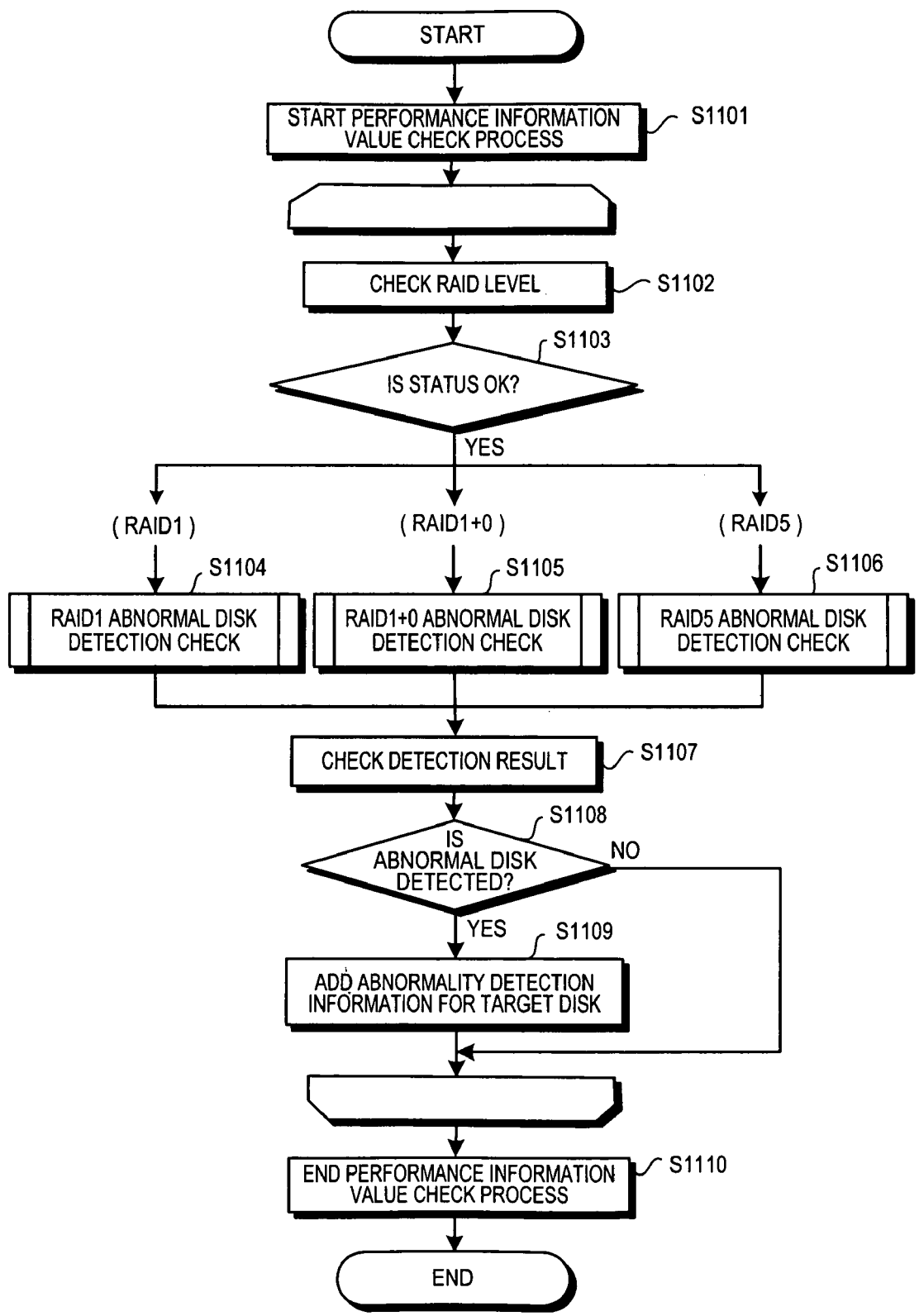
FIG. 11 is a flow chart showing a performance information value check process.
Figure 12:
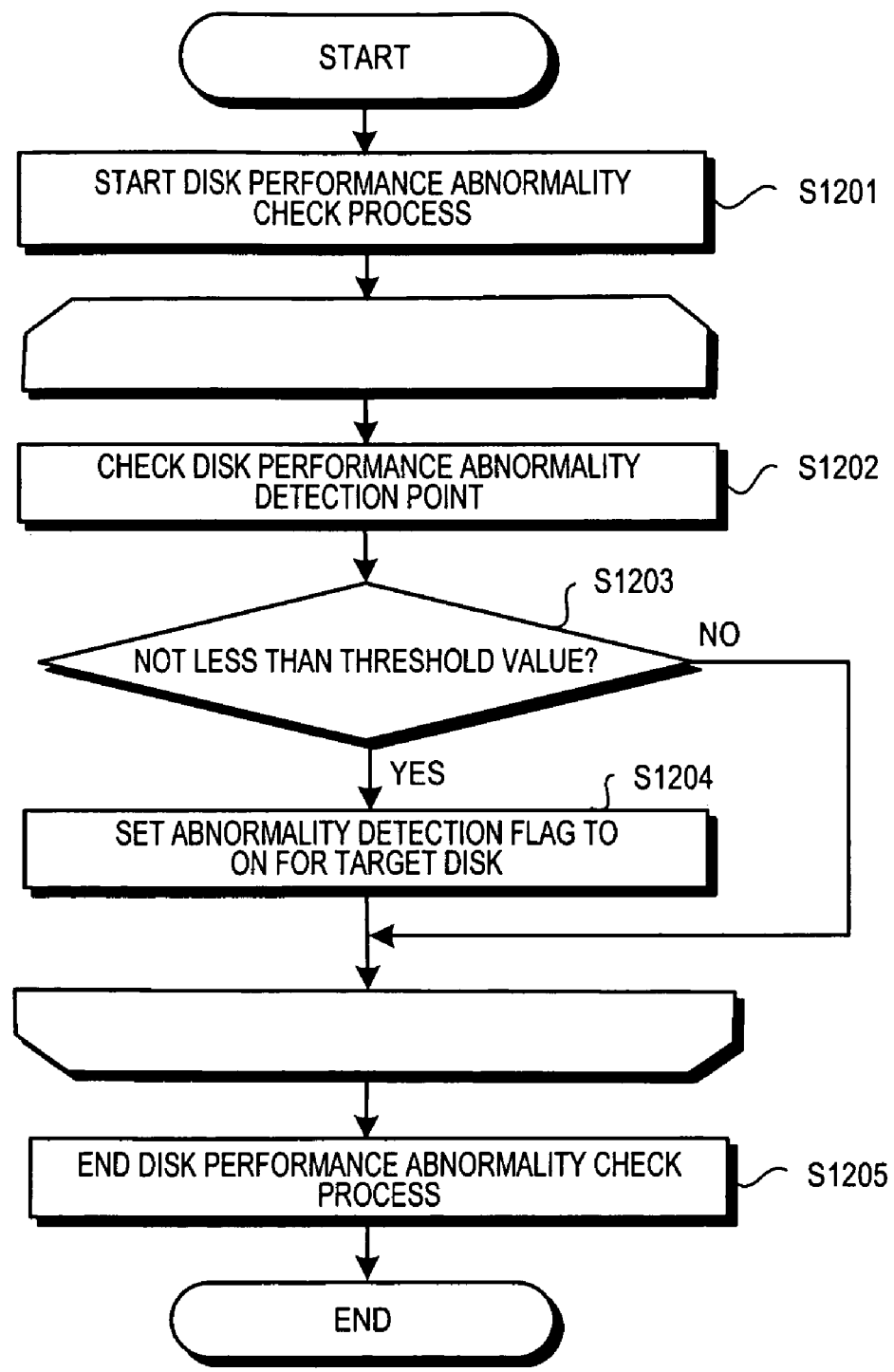
FIG. 12 is a flow chart showing a disk performance abnormality check process.
Figure 13:
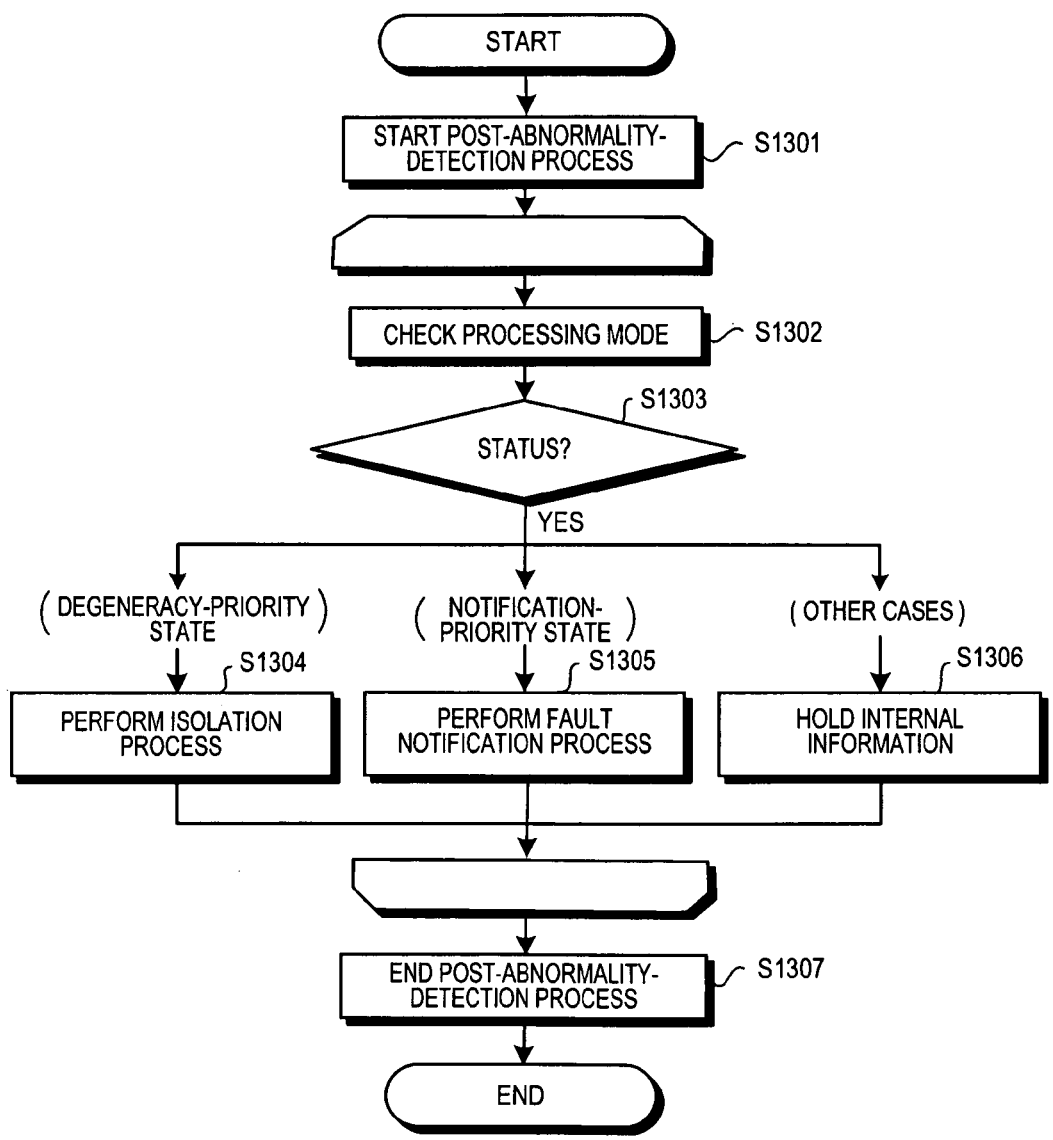
FIG. 13 is a flow chart showing a post-abnormality-detection process.
Figure 14:
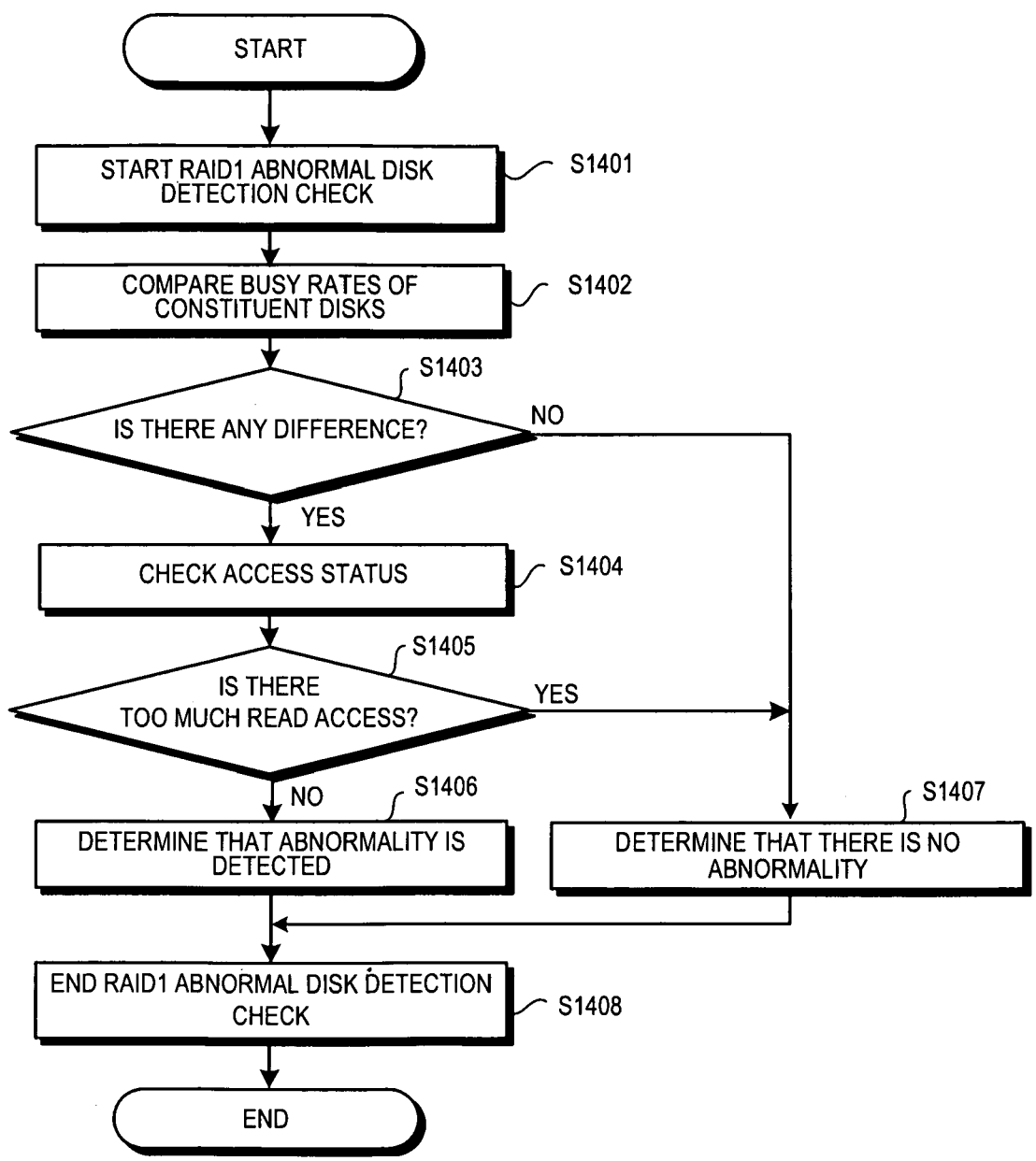
FIG. 14 is a flow chart showing a RAID1 abnormal disk detection process (with mirroring)
Figure 15:
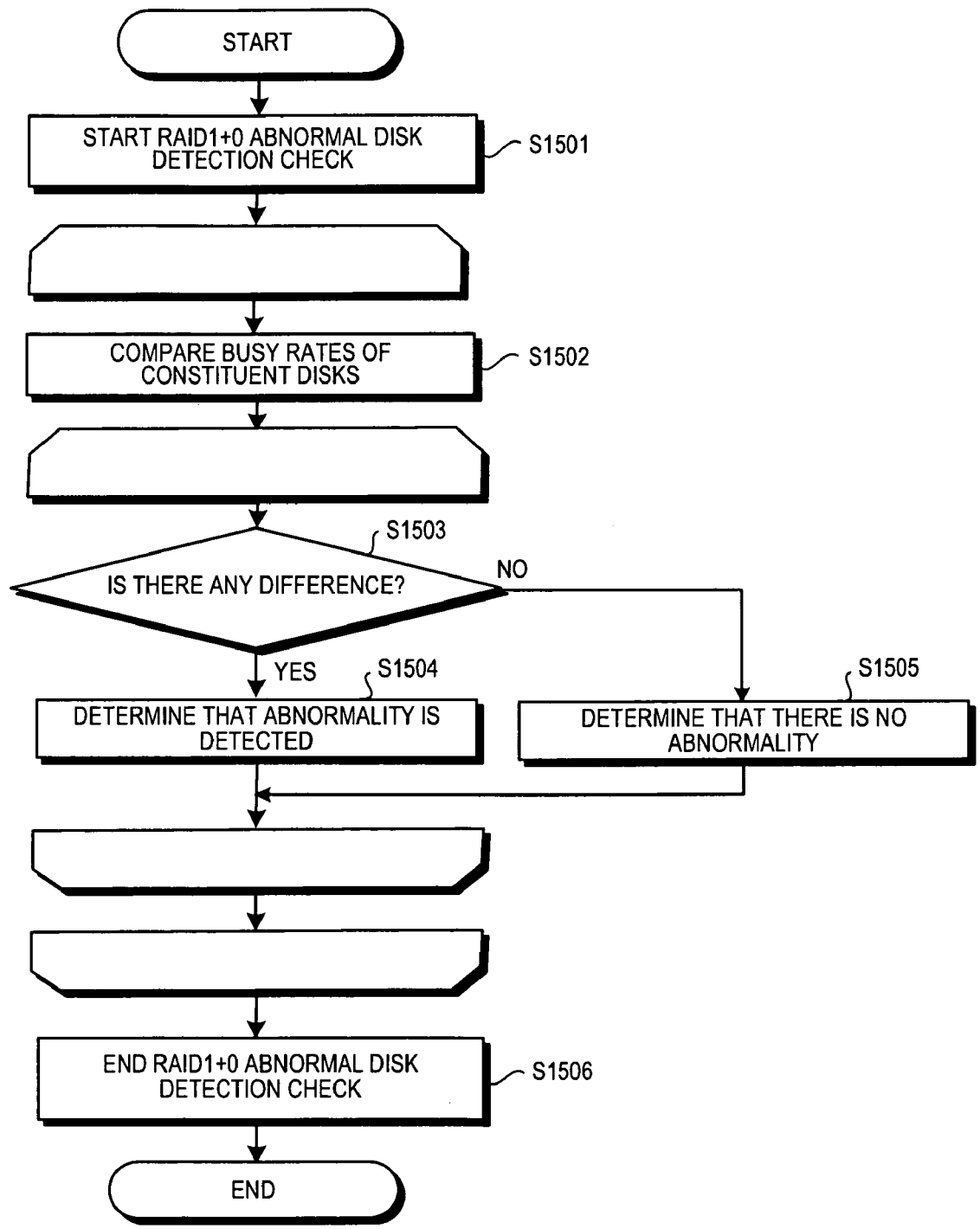
FIG. 15 is a flow chart showing a RAID1+0 abnormal disk detection process (with mirroring and striping)
Figure 16:
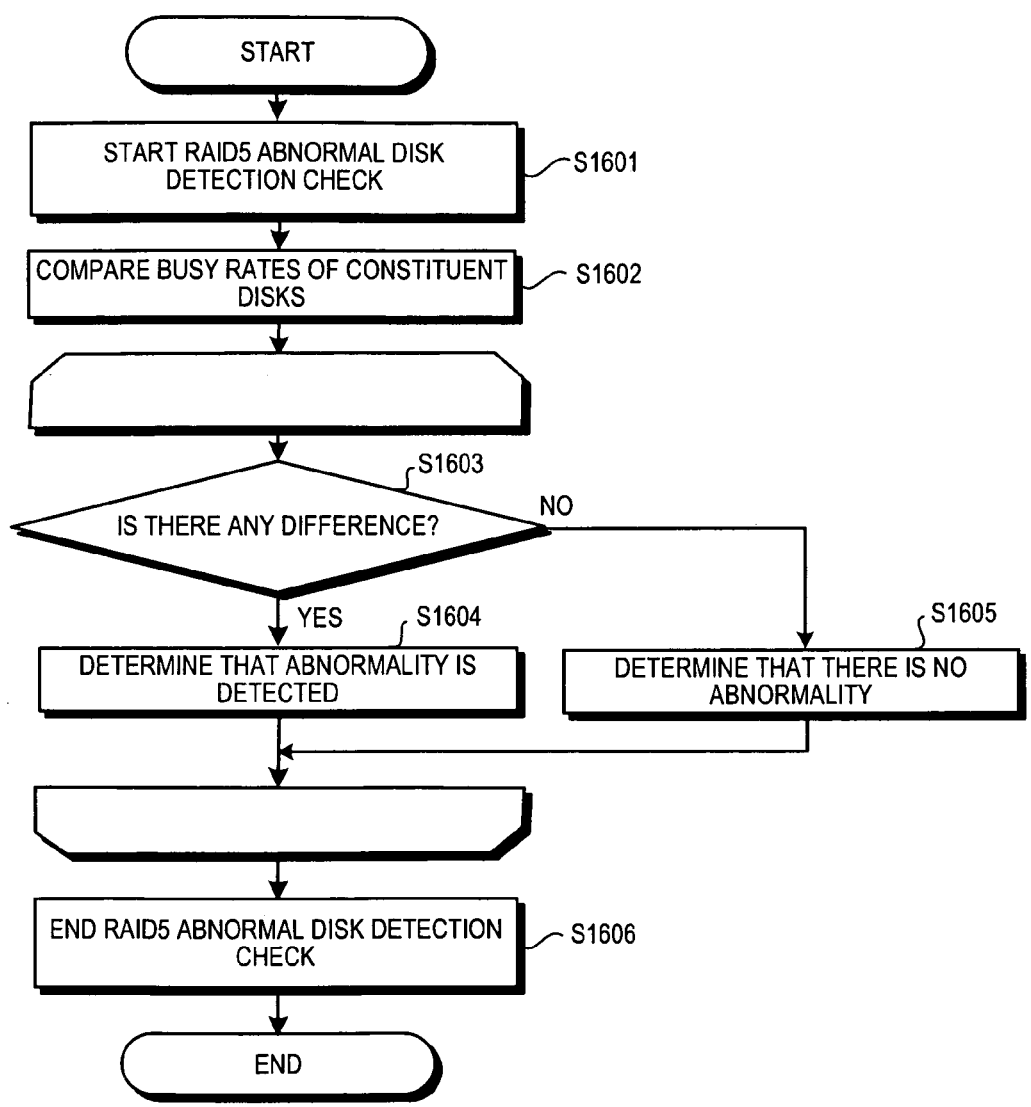
FIG. 16 is a flow chart showing a RAID5 abnormal disk detection process (with parity)

Processing by the disk array apparatus according to the first embodiment will be described with reference to FIGS. 8 to 16. FIG. 8 is a flow chart showing an operation determination/ overall flow. FIG. 9 is a flow chart showing a performance information collection start process. FIG. 10 is a flow chart showing a performance information value collection process. FIG. 11 is a flow chart showing a performance information value check process. FIG. 12 is a flow chart showing a disk performance abnormality check process. FIG. 13 is a flow chart showing a post-abnormality-detection process. FIG. 14 is a flow chart showing a RAID1 abnormal disk detection process (with mirroring). FIG. 15 is a flow chart showing a RAID1+0 abnormal disk detection process (with mirroring and striping). FIG. 16 is a flow chart showing a RAID5 abnormal disk detection process (with parity).

Operation Determination/Overall Flow (FIG. 8)

First, the CM 100 checks whether the logic for disk abnormality detection (detection of a suspected disk suspected of being abnormal in performance) is in operation mode (operation S801). If the logic is not in operation mode (NO in operation S802), i.e., an operation setting is not made, since the disk abnormality detection logic is inactive, the CM 100 ends the process. On the other hand, the logic is in operation mode (YES in operation S802), the CM 100 starts operation of the disk abnormality detection logic (operation S803).

When the disk abnormality detection logic starts, the CM 100 first performs a performance information collection start process (operation S804). More specifically, the CM 100 requests the performance information collection section 131 to start collection of the pieces of performance information of disks. Note that the performance information collection start process will be described in detail later with reference to FIG. 9.

When the performance information collection process by the performance information collection section 131 starts, the CM 100 repeats the process indicated by the loop in FIG. 8 at regular intervals. More specifically, the performance information collection section 131 first collects performance information values of the disks (operation S805). The performance information values include access times for disks and utilization rates calculated on the basis of the access times and the like (disk performance information), utilization rates collected for disks constituting a single RAID group (RAID group performance information), and the statuses of access from an upper-level device to the disks (host access performance information). Note that the performance information value collection process will be described in detail later with reference to FIG. 10.

The suspected disk detection section 132 checks the performance information values (operation S806). That is, the suspected disk detection section 132 compares operating statuses among disks constituting a single RAID group, detects a suspected disk suspected of being abnormal in performance on the basis of the pieces of information collected for the disks by the performance information collection section 131, and an abnormality detection point is added for the suspended disk. The performance information value check process will be described in detail later with reference to FIG. 11.

The abnormality notification/exclusion section 133 checks for a disk performance abnormality (operation S807). That is, the abnormality notification/exclusion section 133 performs abnormality determination (determination for narrowing down as to whether a disk detected as a suspected disk suspected of being abnormal in performance is truly abnormal) on the basis of abnormality detection points accumulated by the suspected disk detection section 132. Note that the disk performance abnormality check process will be described in detail later with reference to FIG. 12.

The abnormality notification/exclusion section 133 determines whether a performance abnormality (corresponding to a case where a disk detected as a suspected disk is determined to be truly abnormal, in the first embodiment) is detected (operation S808). If any performance abnormality is detected (YES in operation S808), the abnormality notification/exclusion section 133 performs a post-abnormality-detection process (operation S809). That is, the abnormality notification/exclusion section 133 performs fault notification (outputs notification information indicating that a suspected disk is detected to a predetermined output section or transmits the notification information to a predetermined destination via a communication section) or recovery processing (excludes the suspected disk from access), on the basis of the determination result in operation S808. Note that the post-abnormality-detection process will be described in detail later with reference to FIG. 13. On the other hand, if no performance abnormality is detected in operation S808 (NO in operation S808), the abnormality notification/exclusion section 133 does not perform the above-described process in operation S809.

The CM 100 checks the number of detection (operation S810) and determines whether check has been performed for a fixed period (operation S811). If a check has been performed for the fixed period (YES in operation S811), the CM 100 resets a detection counter (operation S812). On the other hand, if a check has not been performed for the fixed period (NO in operation S811), the CM 100 does not reset the detection counter.

The CM 100 checks whether the disk abnormality detection logic is in operation mode (operation S813). If the disk abnormality detection logic is not in operation mode (NO in operation S814), i.e., the operation setting is canceled, the CM 100 ends action processes (operation S815) and ends the process. On the other hand, if the disk abnormality detection logic is in operation mode (YES in operation S814), the CM 100 repeats the process indicated by the loop in FIG. 8.

Performance Information Collection Start Process (FIG. 9)

The performance information collection start process in operation S804 of FIG. 8 will be described in detail later. First, the performance information collection section 131 starts the performance information collection start process (operation S901) and checks disks serving as objects to be subjected to performance information collection (operation S902).

When the check of the disks serving as the objects starts, the CM 100 repeats the process indicated by the loop in FIG. 9 times corresponding to the number of the disks. More specifically, the performance information collection section 131 checks the status of one of the disks (operation S903). That is, the performance information collection section 131 checks the mounting status, operating status, and the like of the disk.

If the result of the check shows that the status is good (YES in operation S904), the performance information collection section 131 gives a performance information collection start instruction (operation S905). That is, the performance information collection section 131 gives an instruction to start collection of the pieces of performance information of disks on a module by module basis. If the status is not good in operation S904 (NO in operation S904), the performance information collection section 131 does not perform the above-described operation in operation S905.

The performance information collection section 131 checks the number of remaining ones of the disks serving as the objects to be subjected to performance information collection (operation S906). If there is no remaining disk (YES in operation S907), the performance information collection section 131 ends the performance information collection start process (operation S908).

Performance Information Value Collection Process (FIG. 10)

The performance information value collection process in operation S805 of FIG. 8 will be described in detail. First, the performance information collection section 131 starts the performance information collection process (operation S1001) and checks disks serving as objects to be subjected to performance information collection (operation S1002).

When the check of the disks serving as the objects starts, the CM 100 repeats the process indicated by the loop in FIG. 10 times corresponding to the number of the disks. More specifically, the performance information collection section 1 31 first checks the status of one of the disks (operation S1003). That is, the performance information collection section 131 checks the mounting status, operating status, and the like of the disk.

If the result of the check shows that the status is not good (NO in operation S1004), i.e., in the case of an unmounted state, a failure, power-off, or the like, the performance information collection section 131 regards the disk as a disk to be excluded (operation S1005) and skips the disk.

On the other hand, the status is good (YES in operation S1004), the performance information collection section 131 checks the status of performance information collection (operation S1006). That is, the performance information collection section 131 performs reboot processing for a case where the disk changes from an unmounted state to a mounted state and a case where the disk changes from a failed state to a recovered state.

If the performance information collection is not active (NO in operation S1007), the performance information collection section 131 gives a performance information collection start instruction (operation S1008) and sets an initial value (operation S1009). On the other hand, if the performance information collection is already active (YES in operation S1007), the performance information collection section 131 gives an instruction to transmit a performance information value (operation S1010). That is, the performance information collection section 131 gives an instruction to transmit the performance information value of the target disk to the performance information collection section 131. The performance information value here refers to the access time of each disk.

The performance information collection section 131 stores the performance information value in a management memory (operation S1011). That is, the performance information collection section 131 stores the performance information value in a cache memory, the performance information storage area section 120, and the like in the CM 100.

The performance information collection section 131 checks the number of remaining ones of the disks serving as the objects to be subjected to performance information collection (operation S1012). If there is no remaining disk (YES in operation S1013), the performance information collection section 131 ends the performance information collection process (operation S1014). Note that the performance information collection section 131 appropriately stores, as performance information values, utilization rates calculated on the basis of the access times sent from the performance information collection section 131 and the like (disk performance information), utilization rates collected for disks constituting a single RAID group (RAID group performance information), the statuses of access from an upper-level device to the disks (host access performance information), and the like, in addition to the access times. These performance information values are used, e.g., in combination, as needed.

Performance Information Value Check Process (FIG. 11)

The performance information value check process in operation S806 of FIG. 8 will be described in detail. First, the suspected disk detection section 132 starts the performance information value check process (operation S1101).

When the performance information value check process starts, the suspected disk detection section 132 repeats the process indicated by the loop in FIG. 11 times corresponding to the number of RAID groups. More specifically, the suspected disk detection section 132 checks the RAID level of one of the RAID groups (operation S1102). If the status is good (YES in operation S1103), the suspected disk detection section 132 performs an abnormal disk detection check process according to the level of the RAID group. That is, if the RAID level of the RAID group is "RAID1", the suspected disk detection section 132 performs an abnormal disk detection check process for a RAID group configured as RAID1 (operation S1104). If the RAID level of the RAID group is "RAID1+0", the suspected disk detection section 132 performs an abnormal disk detection check process for a RAID group configured as RAID1+0 (operation S1105). If the RAID level of the RAID group is "RAID5", the suspected disk detection section 132 performs an abnormal disk detection check process for a RAID group configured as RAID5 (operation S1106). Note that the check processes will be described in detail later with reference to FIGS. 14 to 16.

The suspected disk detection section 132 checks the detection result (operation S1107). If an abnormal disk has been detected (YES in operation S1108), the suspected disk detection section 132 adds a piece of detection information for the target abnormal disk (operation S1109). That is, the suspected disk detection section 132 accumulates the piece of detection information for the disk detected as abnormal by the point addition method.

After that, the suspected disk detection section 132 ends the performance information value check process (operation S110).

Disk Performance Abnormality Check Process (FIG. 12)

The disk performance abnormality check process in operation S807 of FIG. 8 will be described in detail. First, the abnormality notification/exclusion section 133 starts the disk performance abnormality check process (operation S1201).

When the disk performance abnormality check process starts, the abnormality notification/exclusion section 133 repeats the process indicated by the loop in FIG. 12 times corresponding to the number of disks. More specifically, the abnormality notification/exclusion section 133 first checks disk performance abnormality detection points (operation S1202). That is, the abnormality notification/exclusion section 133 checks the point of pieces of detection information accumulated by the point addition method for an abnormal disk detected by the suspected disk detection section 132.

If the number of points checked is not less than a predetermined threshold value (YES in operation S1203), the abnormality notification/exclusion section 133 sets an abnormality detection flag to ON for the target disk (operation S1204). On the other hand, if the number is less than the threshold value (NO in operation S1203), the abnormality notification/exclusion section 133 does not perform the above-described process in operation S1204.

After that, the abnormality notification/exclusion section 133 ends the disk performance abnormality check process (operation S1205).

Post-Abnormality-Detection Process (FIG. 13)

The post-abnormality-detection process in operation S809 of FIG. 8 will be described in detail. First, the abnormality notification/exclusion section 133 starts the post-abnormality-detection process (operation S1301).

When the post-abnormality-detection process starts, the abnormality notification/exclusion section 133 repeats the process indicated by the loop in FIG. 13 times corresponding to the number of disks detected as abnormal disks (ones for which abnormality detection flags are set to ON by the abnormality notification/exclusion section 133 of disks detected as suspected disks by the suspected disk detection section 132).

More specifically, the abnormality notification/exclusion section 133 first checks a processing mode depending on settings of the disk array apparatus (operation S1302). If the disk array apparatus is in a degeneracy-priority state, the abnormality notification/exclusion section 133 performs an isolation process (operations S1303 and S1304). That is, the abnormality notification/exclusion section 133 excludes the suspected disk, for which the abnormality detection flag is set to ON, from access.

If the disk array apparatus is in a notification-priority state, the abnormality notification/exclusion section 133 performs a fault notification process (operation S1305). That is, the abnormality notification/exclusion section 133 outputs notification information indicating that the suspected disk, for which the abnormality detection flag is set to ON, is detected to a predetermined output section (e.g., displays the notification on a display or voice-outputs the notification through a speaker) or transmits the notification information to a predetermined destination (e.g., transmits e-mail to a monitoring system of the disk array apparatus).

If the disk array apparatus is in a state other than the degeneracy-priority state and the notification-priority state, the abnormality notification/exclusion section 133 holds the notification information as a piece of internal information (operation S1306). That is, the abnormality notification/exclusion section 133 holds the notification information as a piece of internal information for the suspected disk, for which the abnormality detection flag is set to ON.

After that, the abnormality notification/exclusion section 133 ends the post-abnormality-detection process (operation S1307).

RAID1 Abnormal Disk Detection Process (FIG. 14)

The RAID1 abnormal disk detection check process in S1104 of FIG. 11 will be described in detail. First, the suspected disk detection section 132 starts an abnormal disk detection check process for a RAID group configured as RAID1 (operation S1401).

A RAID group configured as RAID1 can be said to a RAID group with only mirroring. In the case of a RAID group with only mirroring, access may be made to only a group of mirror disks on one side among disks constituting a single RAID group, and read access may be unevenly distributed (although such unevenness is unlikely to occur in a system which distributes read access as needed, read access generally may be unevenly distributed). For this reason, in the RAID1 abnormal disk detection check process, not only comparison of utilization rates among disks but also check of the status of read access are performed, and it is detected whether each disk is a suspected disk suspected of being abnormal in performance, as will be described below.

That is, the suspected disk detection section 132 first compares utilization rates (busy rates) among disks constituting the RAID group (operation S1402). If there is no difference (NO in operation S1403), the suspected disk detection section 132 determines that there is no abnormality (operation S1407) and ends the RAID1 abnormal disk detection check process (operation S1408). That is, the suspected disk detection section 132 compares the utilization rates among the disks. If the result of comparing the highest utilization rate and the second highest utilization rate shows that there is no difference of not less than (n) times (n is a separately set predetermined value) the latter, the suspected disk detection section 132 determines that there is no suspected disk and ends the check process.

On the other hand, if there is a difference (YES in operation S1403), the suspected disk detection section 132 checks the statuses of access (operation S1404). That is, if the result of comparing the highest utilization rate and the second highest utilization rate shows that there is a difference of not less than (n) times the latter, the suspected disk detection section 132 checks a read or write access ratio and the like.

If there is too much read access (YES in operation S1405), the suspected disk detection section 132 determines that there is no abnormality (operation S1407) and ends the RAID1 abnormal disk detection check process (operation S1408). On the other hand, if there is not too much read access (NO in operation S1405), the suspected disk detection section 132 determines that there is an abnormality (operation S1406) and ends the RAID1 abnormal disk detection check process (operation S1408). That is, the suspected disk detection section 132 determines one of the disks with the highest utilization rate as a suspected disk and ends the process.

RAID1+0 Abnormal Disk Detection Process (FIG. 15)

The RAID1+0 abnormal disk detection check process in S1105 of FIG. 11 will be described in detail. First, the suspected disk detection section 132 starts an abnormal disk detection check process for a RAID group configured as RAID1+0 (operation S1501).

A RAID group configured as RAID1+0 can be said to be a RAID group with mirroring and striping. For this reason, in the case of a RAID group configured as RAID1+0, utilization rates are compared among disks on a stripe group by stripe group basis, as will be described below.

That is, when the abnormal disk detection check process starts, the suspected disk detection section 132 repeats the process indicated by a loop shown in FIG. 15 (the outer one of a dual loop) times corresponding to the number of stripe groups. More specifically, the suspected disk detection section 132 first compares utilization rates among disks constituting the single RAID group (operation S1502). That is, for example, the suspected disk detection section 132 compares the utilization rate of a predetermined one of the disks with an average utilization rate for the disks constituting the single RAID group.

The suspected disk detection section 132 repeats the process indicated by a loop shown in FIG. 15 (the inner one of the dual loop) times corresponding to the number of disks of one of the stripe groups. More specifically, the suspected disk detection section 132 determines whether there is a difference between the utilization rate of a predetermined one of the disks and the average utilization rate (operation S1503). If there is no difference, the suspected disk detection section 132 determines that there is no abnormality (operation S1505). That is, if the result of comparing the utilization rate of the predetermined disk with the average utilization rate for the disks constituting the single RAID group shows that there is no difference of not less than a fixed value, the suspected disk detection section 132 determines that there is no suspected disk.

On the other hand, if there is a difference (YES in operation S1503), the suspected disk detection section 132 determines that there is an abnormality (operation S1504). That is, the result of comparing the utilization rate of the predetermined disk with the average utilization rate for the disks constituting the single RAID group shows that there is a difference of not less than the fixed value, the suspected disk detection section 132 determines the disk as a suspected disk.

After that, the suspected disk detection section 132 ends the RAID1+0 abnormal disk detection check process (operation S1506).

RAID5 Abnormal disk Detection Process (FIG. 16)

The RAID5 abnormal disk detection check process in operation S1106 of FIG. 11 will be described in detail. First, the suspected disk detection section 132 starts an abnormal disk detection check process for a RAID group configured as RAID5 (operation S1601).

A RAID group configured as RAID5 can be said to be a RAID group with parity. In the case of a RAID group with parity, access should be evenly made to almost all disks. For this reason, utilization rates are compared among disks in a RAID group configured as RAID5, as will be described below.

More specifically, when the abnormal disk detection check process starts, the suspected disk detection section 132 compares utilization rates among disks constituting the single RAID group (operation S1602). That is, for example, the suspected disk detection section 132 compares the highest utilization rate and the second highest utilization rate.

The suspected disk detection section 132 repeats the process indicated by the loop shown in FIG. 16 times corresponding to the number of disks constituting the RAID disk. More specifically, the suspected disk detection section 132 determines whether there is a difference (operation S1603). If there is no difference (NO in operation S1603), the suspected disk detection section 132 determines that there is no abnormality (operation S1605). That is, the suspected disk detection section 132 compares the highest utilization rate and the second highest utilization rate and, if there is no difference of not less than (n) times (n is a separately set predetermined value) the latter, determines that there is no suspected disk.

On the other hand, if there is a difference (YES in operation S1603), the suspected disk detection section 132 determines that there is an abnormality (operation S1604). That is, the suspected disk detection section 132 compares the highest utilization rate and the second highest utilization rate and, if there is a difference of not less than (n) times the latter, determines that there is a suspected disk.

After that the suspected disk detection section 132 ends the RAID5 abnormal disk detection check process (operation S1606).

Second Embodiment

Other Embodiments

The embodiment of the present invention has been described above. The present invention, however, is not limited to the above-described embodiment and may be implemented in various different forms.

The first embodiment has described a case where a disk array apparatus accumulates a piece of detection information by a point addition method after it detects a suspected disk, and notification or isolation is performed on condition that the point of accumulated pieces of information has exceeded a predetermined threshold value (a case where a disk detected as a suspected disk suspected of being abnormal in performance is further subjected to determination as to whether the disk is truly abnormal). The present invention, however, is not limited to this. For example, when a suspected disk is detected, the suspected disk may be determined as a disk with a performance abnormality regardless of whether the number exceeds the predetermined threshold value, and notification or isolation may be immediately performed. Alternatively, only the process of detecting a suspected disk and holding information to that effect as a piece of internal information may be performed without notification and isolation.

RAID

The first embodiment also has described a "RAID1" group, a "RAID1+0" group, and a "RAID5" group as candidates for a RAID group constituted by a plurality of disks mounted on a disk array apparatus. The present invention, however, is not limited to this. A "RAID1" group merely exemplifies a group with only mirroring; a "RAID1+0" group, a group with mirroring and striping; and a "RAID5" group, a group with parity. The present invention can be similarly applied as appropriate according to whether a RAID group is a group with mirroring, whether a RAID group is a group with striping, whether a RAID group is a group with parity, whether a RAID group is a group with a combination of these, and the like.

Unit of Detection of Performance Abnormality

The first embodiment has described a method in which a disk array apparatus collects pieces of performance information of disks and detects a suspected disk. The present invention, however, is not limited to this. For example, if a DA monitors the header of each disk to acquire an access time for each of sectors of each disk, and a disk array apparatus collects, as a piece of performance information for each of sectors of each disk, an access time for the sector, it is possible to detect a suspected sector suspected of being abnormal in performance. That is, a disk array apparatus according to the present invention collects a piece of performance information for each of objects as predetermined units and compares collected pieces of performance information among objects suitable for comparison, thereby detecting an object suspected of being abnormal in performance.

System Configuration and Others

Of the processes described with reference to the first embodiment, all or some of those which are explained as being automatically performed can be manually performed, and all or some of those which are explained as being manually performed can be automatically performed by a known method (a threshold value used by the abnormality notification/exclusion section may be automatically generated by internal processing of the disk array apparatus or may be inputted by an operations manager of the disk array apparatus). In addition, the processes, control procedures (FIGS. 8 to 15), specific names, and information including various data and parameters illustrated in the specification and drawings can be arbitrarily changed unless otherwise specified.

The components of the devices illustrated in the drawings are functionally conceptual and are not always required to be physically configured as shown in the drawings. That is, the specific form of distribution and integration of each device is not limited to those illustrated in the drawings (FIGS. 2 to 4), and all of or part of the components may be configured to be functionally or physically distributed or integrated in arbitrary units according to various loads, the status of use, and the like. Further, all of or arbitrary ones of the processing functions to be performed by the devices are realized by a CPU and a program which is analyzed and executed by the CPU. Alternatively, they can be realized as hardware based on wired logic.

Program

Figure 17:
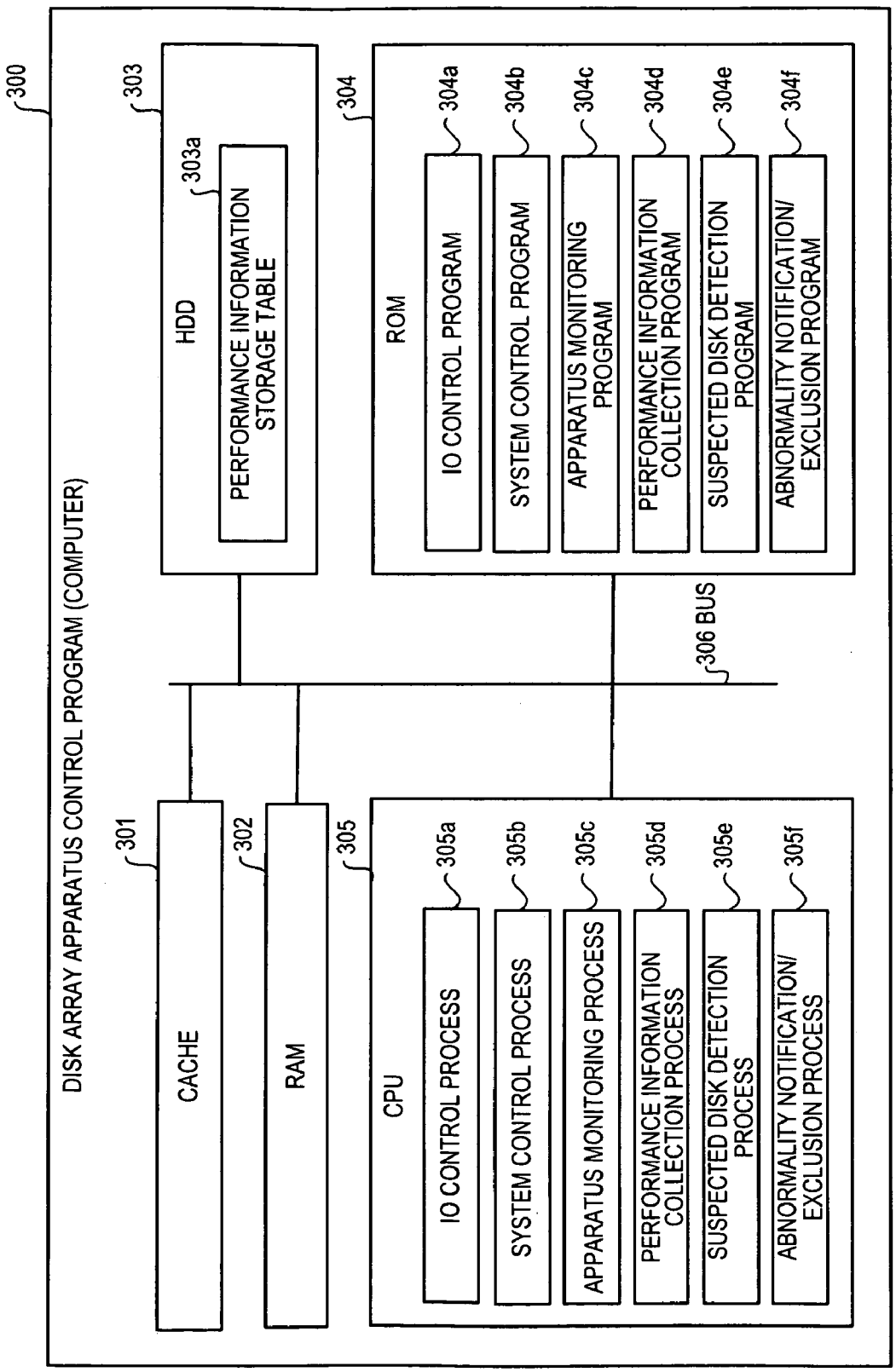
FIG. 17 is a diagram showing a computer which executes a disk array apparatus control program.

The processes described with reference to the above-described first embodiment can be realized when a computer such as a personal computer or workstation executes a prepared program. An example of a computer which executes a disk array apparatus control program having functions similar to those in the first embodiment will be described below with reference to FIG. 17. FIG. 17 is a diagram showing a computer which executes the disk array apparatus control program.

As shown in FIG. 17, a computer 300 is composed of a cache 301, a RAM 302, an HDD 303, a ROM 304, and a CPU 305 connected by a bus 306. A disk array apparatus control program which performs functions similar to those in the above-described first embodiment, i.e., an IO control program 304a, a system control program 304b, an apparatus monitoring program 304c, a performance information collection program 304d, a suspected disk detection program 304e, and an abnormality notification/exclusion program 304f are stored in advance in the ROM 304, as shown in FIG. 17.

The CPU 305 reads out and executes each of the programs 304a to 304f. With this action, the programs 304a to 304f become an IO control process 305a, a system control process 305b, an apparatus monitoring process 305c, a performance information collection process 305d, a suspected disk detection process 305e, and an abnormality notification/exclusion process 305f, as shown in FIG. 17. Note that the processes 305a to 305f respectively correspond to the IO control section 111, system control section 112, apparatus monitoring section 113, performance information collection section 131, suspected disk detection section 132, and abnormality notification/exclusion section 133 shown in FIG. 4.

A performance information storage table 303a is provided in the HDD 303, as shown in FIG. 17. Note that the performance information storage table 303a corresponds to the performance information storage area section 120 shown in FIG. 4.

The above-described programs 304a to 304f need not necessarily be stored in the ROM 304. For example, the programs 304a to 304f may be stored on a "portable physical medium" such as a flexible disk (FD), CD-ROM, MO disk, DVD disk, magneto-optical disk, or IC card that is inserted into the computer 300, on a "fixed physical medium" such as a hard disk drive (HDD) that is provided inside or outside the computer 300, or in "another computer (or server)" that is connected to the computer 300 via a public circuit, the Internet, a LAN, a WAN, or the like. The computer 300 may read out and execute the programs from these media.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk array apparatus which has a plurality of disks constituting a mounted RAID group and controls access from an upper-level device to each of the disks, comprising:
   a performance information collector collecting a piece of performance-related information of each of the disks; and
   a suspected disk detector comparing the pieces of information collected for the disks by the performance information collector among disks constituting a single one of the RAID group and detecting a suspected disk suspected of being abnormal in performance based on a result of the comparison.

2. The disk array apparatus according to claim 1, wherein the performance information collector collects a utilization rate of each of the disks derived from the access within a predetermined time as the piece of performance-related information, and the suspected disk detector compares the utilization rates and detects the suspected disk.

3. The disk array apparatus according to claim 1, wherein the suspected disk detector determines the type of the RAID group and performs comparison according to the type.

4. The disk array apparatus according to claim 1, further comprising
   a notifier outputting notification information indicating that the suspected disk is detected to a predetermined output section or transmitting the notification information to a predetermined destination via a communication section when the suspected disk is detected by the suspected disk detector.

5. The disk array apparatus according to claim 1, further comprising
   an excluder excluding the suspected disk from the access when the suspected disk is detected by the suspected disk detector.

6. The disk array apparatus according to claim 4, further comprising
   an excluder excluding the suspected disk from the access when the suspected disk is detected by the suspected disk detector, wherein
   the suspected disk detector accumulates a piece of detection information for the suspected disk by a point addition method when the suspected disk is detected, and
   the notifier outputs or transmits the notification information and the excluder excludes the suspected disk on condition that the number of points accumulated by the suspected disk detector has exceeded a predetermined threshold value.

7. A computer-readable recording medium storing a disk array apparatus control program for causing a disk array apparatus as a computer to perform a method for mounting a plurality of disks constituting a RAID group and controlling access from an upper-level device to each of the disks, the disk array apparatus control program causing the computer to perform:
   a performance information collection procedure for collecting a piece of performance-related information of each of the disks; and
   a suspected disk detection procedure for comparing the pieces of information collected for the disks by the performance information collection procedure among disks constituting a single one of the RAID group and detecting a suspected disk suspected of being abnormal in performance based on a result of the comparison.

8. A disk array apparatus control method for mounting a plurality of disks constituting a RAID group and controlling access from an upper-level device to each of the disks, comprising:
   collecting a piece of performance-related information of each of the disks; and
   comparing the pieces of information collected for the disks among disks constituting a single one of the RAID group and detecting a suspected disk suspected of being abnormal in performance based on a result of the comparison.

9. The disk array apparatus according to claim 1, further comprising:
   an operation checker checking whether a disk abnormality detection operation is in operation or not.

10. The disk array apparatus according to claim 1, wherein the performance information collector checks a status of each of the disks, and collects the piece of performance-related information based on the results of the status.

11. The disk array apparatus according to claim 1, wherein the suspected disk detector compares a highest utilization rate and a second highest utilization rate of each of the disks, and detects a disk which has the highest utilization rate as the suspected disk when a difference between the highest utilization rate and the second highest utilization rate is not less than n times the second highest utilization rate, and
wherein n is a separately set predetermined value.

* * * * *